United States Patent [19]

Wakabayashi et al.

[11] 3,955,410

[45] May 11, 1976

[54] METHOD FOR MEASURING A DRIVING POWER BY MEANS OF AN INDUCTION MOTOR

[75] Inventors: Takeshi Wakabayashi; Kiyoshi Takatsuka; Akira Takagi, all of Nagoya, Japan

[73] Assignee: Mitsubishi Jukogyo Kabushiki Kaisha, Tokyo, Japan

[22] Filed: Oct. 21, 1974

[21] Appl. No.: 516,803

[30] Foreign Application Priority Data

Oct. 25, 1973    Japan.............................. 48-120145

[52] U.S. Cl................................ 73/133 R; 73/117
[51] Int. Cl.² ........................................ G01L 5/13
[58] Field of Search................. 73/116, 117, 133 R, 73/134, 117.3

[56] References Cited

UNITED STATES PATENTS

| | | | |
|---|---|---|---|
| 3,286,517 | 11/1966 | Ostrander | 73/134 X |
| 3,402,600 | 9/1968 | Athey | 73/117.3 X |
| 3,596,511 | 8/1971 | Hart | 73/116 X |

Primary Examiner—Jerry W. Myracle
Attorney, Agent, or Firm—Cushman, Darby & Cushman

[57] ABSTRACT

A method for measuring a driving power by means of an induction motor is disclosed, in which a power drive apparatus to be measured is coupled to a rotary shaft of the induction motor, an electric current is fed to said induction motor while driving said induction motor into rotation at a speed higher than its rated r.p.m., and the driving power of said power drive apparatus to be measured is determined by measuring a voltage, current and r.p.m. of said induction motor.

1 Claim, 3 Drawing Figures

METHOD FOR MEASURING A DRIVING POWER BY MEANS OF AN INDUCTION MOTOR

BACKGROUND OF THE INVENTION

The present invention relates to a method for measuring a driving power by means of an induction motor, in which a driving power of a power drive apparatus such as, for example, an automobile is measured by making use of an induction motor.

Heretofore, as an apparatus for measuring a driving power and a speed of an automobile is known a chassis dynamometer as shown in FIG. 1. Upon measuring a driving power of an automobile by means of the chassis dynamometer, driving wheels 11a and 11b of the automobile are positioned across a pair of rollers 12a and 12b and across another pair of rollers 13a and 13b, respectively, as shown in FIG. 1, to cause an equivalent inertia mass 14 which is preliminarily loaded onto a shaft of the roller 12b, to be rotated by the driving torque of the driving wheels, so that a voltage proportional to an r.p.m. of the rollers 12a, 12b, 13a an 13b is generated in a hydraulic dynamometer or eddy-current meter 15 by the rotational energy of the equivalent inertia mass 14. The voltage generated by the eddy-current meter 15 is applied across the terminals of a slide resistor in a torque bridge 16. On the other hand, a reaction torque generated in response to power absorption by a driving power absorber (not shown) is applied to a torque arm of the torque bridge 16, and by the action of said reaction torque the torque bridge 16 is moved up and down so that the voltage applied by the eddy-current meter 15 may be divided thereby. And after this value has been compared with the torque and the r.p.m., the shaft output is indicated by a meter 17 in PS units.

Though a driving power of an automobile has been measured in the above-described manner, said chassis dynamometer requires a considerable skill for the purpose that both the automobile speed and the torque should be simultaneously adjusted for achieving a stable operation at a particular measuring point. In addition, the use of a hydraulic dynamometer or eddy-current meter 15 involves difficulties that a measurement efficiency is low, associated equipments such as a driving power absorber and the like are necessitated, and the construction becomes complexed.

SUMMARY OF THE INVENTION

The present invention has been worked out in order to eliminate the aforementioned disadvantages in the prior art.

It is an object of the present invention to provide a method for measuring a driving power by means of an induction motor, in which driving power measurement can be performed easily and also efficiently within a short period of time.

According to one feature of the present invention, a power drive apparatus to be measured is coupled to a rotary shaft of an induction motor, an electric current is fed to said induction motor while driving said induction motor into rotation at a speed higher than its rated r.p.m., and the driving power of said power drive apparatus to be measured is determined by measuring a voltage, current and r.p.m. of said induction motor.

DESCRIPTION OF THE PREFERRED EMBODIMENT

Figure 1:
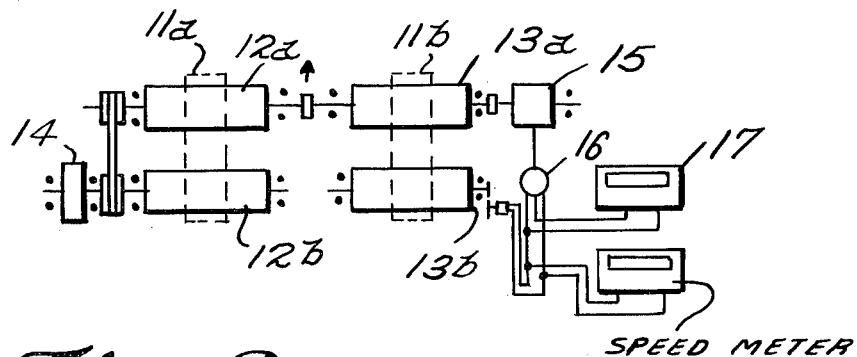
FIG. 1 is a schematic view showing driving power measuring means in the prior art.
Figure 2:
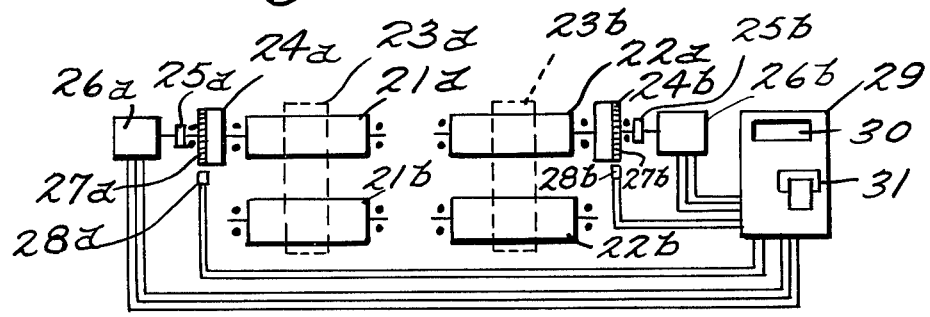
FIG. 2 is a schematic view showing one preferred embodiment of the present invention.

Now one preferred embodiment of the present invention will be described with reference to the accompanying drawings. A pair of rollers 21a and 21b and another pair of rollers 22a and 22b are, respectively, arranged in parallel to each other, and driving wheels 23a and 23b of a power drive apparatus to be measured such as, for example, an automobile are positioned across said rollers 21a and 21b and across said rollers 22a and 22b, respectively, as shown in FIG. 2. To the shafts of said rolles 21a and 22a are mounted equivalent inertia weights 24a and 24b, and also are coupled rotary shafts of induction motors 26a and 26b via coupling means 25a and 25b, respectively. In addition, to said equivalent inertia weight 24a and 24b are mounted pulse generating teeth 27a and 27b, and further there are provided pulse generators 28a and 28b in an opposed relationship to said pulse generating teeth 27a and 27b, respectively. These pulse generators 28a and 28b serve to generate pulse signals in response to rotation of the pulse generating teeth 27a and 27b, and these pulse signals are transmitted to an electronic computer 29 to be stored therein. In addition, a control for the current feed to the induction motors 26a and 26b is carried out by the intermediary of the electronic computer 29, and the driving voltage and the driving current of the induction motors are stored in the electronic computer 29. This electronic computer 29 is provided with a display meter 30 and a printing section 31, and it makes analytical calculation on the pulse signals sent from the pulse generators 28a and 28b and the driving voltage and current of the induction motors 26a and 26b to derive a driving power of an automobile, which is displayed on the display meter 30. Still further, a standard performance of the power drive apparatus to be measured is preliminarily stored in the electronic computer 29, so that by comparing the standard performance with the above-described results of measurement the quality of the power drive apparatus to be measured can be determined, and the results can be automatically printed out by the printing section 31.

With the aforementioned construction of the apparatus, in order to measure a driving power of an automobile to be measured, at first the driving wheels 23a and 23b of the automobile to be measured are placed across the rollers 21a and 21b and across the rollers 22a and 22b, respectively. Then, while the induction motors 26a and 26b are not being fed with an electric current, the driving wheels 23a and 23b are driven to rotate the motors 26a and 26b via the rollers 21a and 22a, respectively, and when the r.p.m. of the motors 26a and 26b has become close to their rated r.p.m. value, a current is fed to these motors 26a and 26b. Subsequently, a shift lever of the automobile to be measured is shifted to a top gear position, an acceleration pedal is gradually depressed until the r.p.m. of the motors 26a and 26b exceeds the rated r.p.m. values by 5 – 10 %, and while a stable speed is maintained, the voltage and current of the motors 26a and 26b and the output pulse signals of the pulse generators 28a and 28b are stored in the electronic computer 29. Thereafter, the electric power source for the motors 26a and 26b is automatically switched off by the electronic computer 29, and the acceleration pedal is released. In other words, with respect to the rating capacity of the induction motors 26a and 26b, an external torque under an overspeed and overload condition is applied to the induction motors for a short period of time such as, for example, about 10 seconds, and the voltage, current and speed informations at this time are stored in the electronic computer 29. The electronic computer 29 analyses and calculates the aforementioned informations, that is, the voltage and current of the motors 26a and 26b and the output signals of the pulse generators 28a and 28b to determine the driving power of the automobile to be measured, the results being displayed on the display meter 30, and also after the quality of the performance has been determined by comparing the results with a standard performance of said automobile engine which was preliminarily stored in the computer, the results of determination are automatically printed out by the printing section 31.

Figure 3:
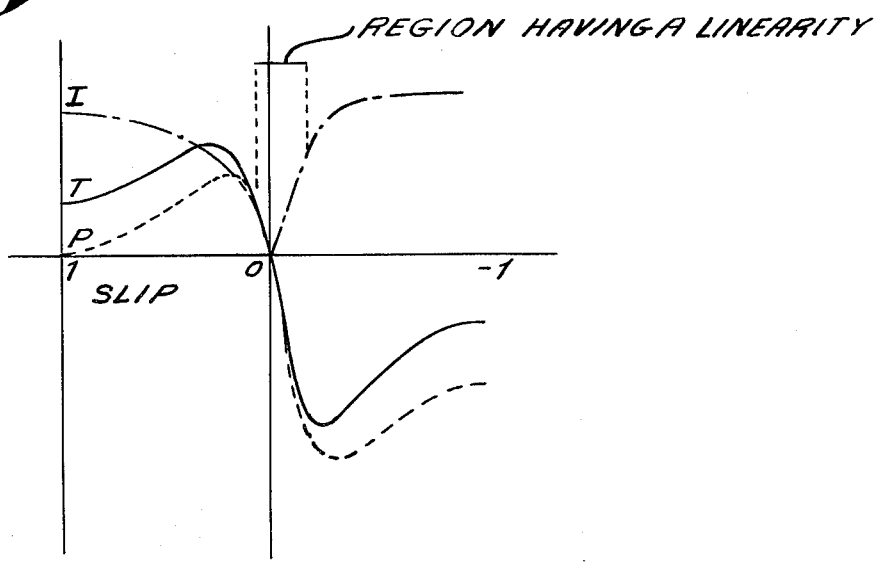
FIG. 3 is a diagram showing overspeed characteristics of an induction motor to be used according to the present invention.

Generally, a characteristic performance of the induction motors 26a and 26b involves various factors in the rating range, and it has been well-known that by measuring an electric current flowing therethrough, an input, output, slip, etc. can be obtained on the basis of the characteristic curves. Therefore, deriving a characteristic performance at an overspeed by various combined calculation methods, the characteristic curves of current I vs. slip and torque T vs. slip have a linearity up to about 10% overspeed with respect to the rated speed (zero slip) as shown in FIG. 3, and they have a simple proportional relationship to each other. Accordingly, the load driving power can be normally known through the steps of measuring the electric current value within the overspeed region having a linearity, calculating the torque by multiplying a constant, and thereby finding the speed.

As fully described above, the present invention is featured by the fact that a power drive apparatus to be measured is coupled to a rotary shaft of the induction motor, an electric current is fed to said induction motor while driving said induction motor into rotation at a speed higher than its rated r.p.m., and the driving power of said power drive apparatus to be measured is determined by measuring a voltage, current and r.p.m. of said induction motor. Therefore, driving power measurement at a constant speed can be performed easily and also efficiently within a short period of time. In addition, since the driving power measurement can be performed without mounting a driving power absorber, a special installation cost is unnecessary, and so the present invention provides a method for measuring a driving power by means of an induction motor which is desirable also from an economical point of view.

What is claimed is:

1. A method of measuring the driving power of a power drive by employing an induction motor of the type having a characteristic curve which is linear within a region which includes the rated speed of the motor, comprising the steps of:

coupling the power drive to said motor to rotate the motor within said region at a speed higher than its rated speed;

applying current to said motor to maintain the rotational speed of the motor constant within said region; and measuring voltage, current and speed of the motor during the period that the rotational speed of the motor is constant.

* * * * *